United States Patent [19]

Allen

[11] 3,805,232

[45] Apr. 16, 1974

[54] ENCODER/DECODER FOR CODE WORDS OF VARIABLE LENGTH

[75] Inventor: Larry Van Allen, Phoenix, Ariz.

[73] Assignee: Honeywell Information Systems, Inc., Waltham, Mass.

[22] Filed: Jan. 24, 1972

[21] Appl. No.: 219,998

[52] U.S. Cl. .................................... 340/146.1 AL

[51] Int. Cl. .......................................... G06f 11/12

[58] Field of Search ............340/146.1, 146.1 AL, 340/146.1 AV

[56] References Cited

UNITED STATES PATENTS

| | | | |
|---|---|---|---|
| 3,159,810 | 12/1964 | Fire | 340/146.1 AL |
| 3,311,879 | 3/1967 | Daher | 340/146.1 AL |
| 3,582,881 | 6/1971 | Burton | 340/146.1 AL |
| 3,622,985 | 11/1971 | Ayling et al. | 340/146.1 AL |
| 3,638,182 | 1/1972 | Burton et al. | 340/146.1 AL |

*Primary Examiner*—Malcolm A. Morrison
*Assistant Examiner*—David H. Malzahn
*Attorney, Agent, or Firm*—Edward W. Hughes; Walter W. Nielsen

[57] ABSTRACT

An encoder/decoder is described in which a conventional feedback shift register for encoding cyclic code words is augmented by an auxiliary feedback shift register. The auxiliary register is interconnected in such a manner that it provides appropriate feedback paths for enabling error correction for a code word of any shortened length.

4 Claims, 6 Drawing Figures

ENCODING:

| INPUT | $X^0$ | $X^1$ | $X^2$ | $X^3$ | $X^4$ | $X^5$ | $X^6$ | $X^7$ |
|---|---|---|---|---|---|---|---|---|
| INITIAL | 0 | 0 | 0 | 0 | 0 | 0 | 0 | 0 |
| 1 | 1 | 1 | 0 | 1 | 0 | 1 | 1 | 0 |
| 0 | 0 | 1 | 1 | 0 | 1 | 0 | 1 | 1 |
| 0 | 1 | 1 | 1 | 0 | 0 | 0 | 1 | 1 |
| 1 | 0 | 1 | 1 | 1 | 0 | 0 | 0 | 1 |
| 0 | 1 | 1 | 1 | 0 | 1 | 1 | 1 | 0 |
| 0 | 0 | 1 | 1 | 1 | 0 | 1 | 1 | 1 |
| 0 | 1 | 1 | 1 | 0 | 1 | 1 | 0 | 1 |
| 0 | 1 | 0 | 1 | 0 | 0 | 0 | 0 | 0 |
| 1 | 1 | 0 | 0 | 0 | 0 | 1 | 1 | 0 |
| 0 | 0 | 1 | 0 | 0 | 0 | 0 | 1 | 1 |

FIG. 2a

DECODING; NO ERROR:

| | | | | | | | | | $Y^0$ | $Y^1$ | $Y^2$ | $Y^3$ | $Y^4$ | $Y^5$ | $Y^6$ | $Y^7$ |
|---|---|---|---|---|---|---|---|---|---|---|---|---|---|---|---|---|
| INITIAL | 0 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 1 | 0 | 0 | 0 | 0 | 0 | 0 | 1 | 0 |
| 0 | 0 | 0 | 0 | 0 | 0 | 0 | 0 | 1 | 0 | 0 | 0 | 0 | 0 | 1 | 0 | 0 |
| 0 | 0 | 0 | 0 | 0 | 0 | 0 | 0 | 1 | 0 | 0 | 0 | 0 | 1 | 0 | 0 | 0 |
| 1 | 0 | 0 | 0 | 0 | 1 | 0 | 0 | 1 | 0 | 0 | 0 | 1 | 0 | 0 | 0 | 0 |
| 0 | 0 | 0 | 0 | 0 | 1 | 0 | 0 | 1 | 0 | 0 | 1 | 0 | 0 | 0 | 0 | 0 |
| 0 | 0 | 0 | 0 | 0 | 1 | 0 | 0 | 1 | 0 | 1 | 0 | 0 | 0 | 0 | 0 | 0 |
| 0 | 0 | 0 | 0 | 0 | 1 | 0 | 0 | 1 | 1 | 0 | 0 | 0 | 0 | 0 | 0 | 0 |
| 0 | 0 | 0 | 0 | 0 | 1 | 0 | 0 | 1 | 1 | 0 | 1 | 0 | 1 | 1 | 0 | 1 |
| 1 | 1 | 0 | 1 | 0 | 0 | 1 | 0 | 0 | 1 | 1 | 1 | 1 | 0 | 1 | 1 | 1 |
| 0 | 1 | 0 | 1 | 0 | 0 | 1 | 0 | 0 | 0 | 1 | 0 | 0 | 0 | 0 | 1 | 1 |
| 1 | 1 | 1 | 1 | 0 | 0 | 1 | 1 | 1 | 1 | 0 | 0 | 0 | 0 | 1 | 1 | 0 |
| 1 | 0 | 1 | 1 | 0 | 0 | 0 | 0 | 1 | 1 | 0 | 1 | 0 | 0 | 0 | 0 | 1 |
| 0 | 0 | 1 | 1 | 0 | 0 | 0 | 0 | 1 | 1 | 1 | 1 | 0 | 1 | 1 | 1 | 1 |
| 0 | 0 | 1 | 1 | 0 | 0 | 0 | 0 | 1 | 0 | 1 | 1 | 1 | 0 | 0 | 1 | 1 |
| 0 | 0 | 1 | 1 | 0 | 0 | 0 | 0 | 1 | 1 | 1 | 1 | 0 | 0 | 1 | 1 | 0 |
| 0 | 0 | 1 | 1 | 0 | 0 | 0 | 0 | 1 | 0 | 1 | 1 | 0 | 0 | 0 | 0 | 1 |
| 1 | 0 | 0 | 0 | 0 | 0 | 0 | 0 | 0 | 1 | 1 | 0 | 0 | 0 | 0 | 1 | 0 |
| 0 | 0 | 0 | 0 | 0 | 0 | 0 | 0 | 0 | | | | | | | | |

FIG. 2b

| INPUT | $X^0$ | $X^1$ | $X^2$ | $X^3$ | $X^4$ | $X^5$ | $X^6$ | $X^7$ | $Y^0$ | $Y^1$ | $Y^2$ | $Y^3$ | $Y^4$ | $Y^5$ | $Y^6$ | $Y^7$ |
|---|---|---|---|---|---|---|---|---|---|---|---|---|---|---|---|---|
| INITIAL | 0 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 1 | 0 | 0 | 0 | 0 | 0 | 0 | 1 | 0 |
| 0 | 0 | 0 | 0 | 0 | 0 | 0 | 0 | 1 | 0 | 0 | 0 | 0 | 0 | 1 | 0 | 0 |
| 1 | 0 | 0 | 0 | 0 | 0 | 1 | 0 | 1 | 0 | 0 | 0 | 0 | 1 | 0 | 0 | 0 |
| 0 | 0 | 0 | 0 | 0 | 0 | 1 | 0 | 1 | 0 | 0 | 0 | 1 | 0 | 0 | 0 | 0 |
| 0 | 0 | 0 | 0 | 0 | 0 | 1 | 0 | 1 | 0 | 0 | 1 | 0 | 0 | 0 | 0 | 0 |
| 0 | 0 | 0 | 0 | 0 | 0 | 1 | 0 | 1 | 0 | 1 | 0 | 0 | 0 | 0 | 0 | 0 |
| 0 | 0 | 0 | 0 | 0 | 0 | 1 | 0 | 1 | 1 | 0 | 0 | 0 | 0 | 0 | 0 | 0 |
| 0 | 0 | 0 | 0 | 0 | 0 | 1 | 0 | 1 | 1 | 0 | 1 | 0 | 1 | 1 | 0 | 1 |
| 1 | 1 | 0 | 1 | 0 | 1 | 0 | 0 | 0 | 1 | 1 | 1 | 1 | 0 | 1 | 1 | 1 |
| 0 | 1 | 0 | 1 | 0 | 1 | 0 | 0 | 0 | 0 | 1 | 0 | 0 | 0 | 0 | 1 | 1 |
| 1 | 1 | 1 | 1 | 0 | 1 | 0 | 1 | 1 | 1 | 0 | 0 | 0 | 0 | 1 | 1 | 0 |
| 1 | 0 | 1 | 1 | 0 | 1 | 1 | 0 | 1 | 1 | 0 | 1 | 0 | 0 | 0 | 0 | 1 |
| 0 | 0 | 1 | 1 | 0 | 1 | 1 | 0 | 1 | 1 | 1 | 1 | 0 | 1 | 1 | 1 | 1 |
| 0 | 0 | 1 | 1 | 0 | 1 | 1 | 0 | 1 | 0 | 1 | 1 | 1 | 0 | 0 | 1 | 1 |
| 0 | 0 | 1 | 1 | 0 | 1 | 1 | 0 | 1 | 1 | 1 | 1 | 0 | 0 | 1 | 1 | 0 |
| 0 | 0 | 1 | 1 | 0 | 1 | 1 | 0 | 1 | 0 | 1 | 1 | 0 | 0 | 0 | 0 | 1 |
| 1 | 0 | 0 | 0 | 0 | 1 | 1 | 0 | 0 | 1 | 1 | 0 | 0 | 0 | 0 | 1 | 0 |
| 0 | 0 | 0 | 0 | 0 | 1 | 1 | 0 | 0 | | | | | | | | |

APPLY CORRECTION 0 0 0 0 0 0 (ALL 0) 1 1 0 (ERROR PATTERN)

FIG. 2c

EXAMPLE; NO ERROR:

| INPUT | $X_1^0$ | $X_1^1$ | $X_1^2$ | $Y_1^0$ | $Y_1^1$ | $Y_1^2$ | $X_2^0$ | $X_2^1$ | $X_2^2$ | $X_2^3$ | $X_2^4$ | $Y_2^0$ | $Y_2^1$ | $Y_2^2$ | $Y_2^3$ | $Y_2^4$ |
|---|---|---|---|---|---|---|---|---|---|---|---|---|---|---|---|---|
| INITIAL | 0 | 0 | 0 | 0 | 0 | 1 | 0 | 0 | 0 | 0 | 0 | 0 | 0 | 0 | 0 | 1 |
| 1 | 0 | 0 | 1 | 0 | 1 | 0 | 0 | 0 | 0 | 0 | 1 | 0 | 0 | 0 | 1 | 0 |
| 0 | 0 | 0 | 1 | 1 | 0 | 0 | 0 | 0 | 0 | 0 | 1 | 0 | 0 | 1 | 0 | 0 |
| 0 | 0 | 0 | 1 | 1 | 0 | 1 | 0 | 0 | 0 | 0 | 1 | 0 | 1 | 0 | 0 | 0 |
| 1 | 1 | 0 | 0 | 1 | 1 | 1 | 0 | 1 | 0 | 0 | 1 | 1 | 0 | 0 | 0 | 0 |
| 0 | 1 | 0 | 0 | 0 | 1 | 1 | 0 | 1 | 0 | 0 | 1 | 0 | 0 | 0 | 0 | 1 |
| 0 | 1 | 0 | 0 | 1 | 1 | 0 | 0 | 1 | 0 | 0 | 1 | 0 | 0 | 0 | 1 | 0 |
| 0 | 1 | 0 | 0 | 0 | 0 | 1 | 0 | 1 | 0 | 0 | 1 | 0 | 0 | 1 | 0 | 0 |
| 0 | 1 | 0 | 0 | 0 | 1 | 0 | 0 | 1 | 0 | 0 | 1 | 0 | 1 | 0 | 0 | 0 |
| 1 | 1 | 1 | 0 | 1 | 0 | 0 | 0 | 0 | 0 | 0 | 1 | 1 | 0 | 0 | 0 | 0 |
| 0 | 1 | 1 | 0 | 1 | 0 | 1 | 0 | 0 | 0 | 0 | 1 | 0 | 0 | 0 | 0 | 1 |
| 1 | 0 | 1 | 1 | 1 | 1 | 1 | 0 | 0 | 0 | 0 | 0 | 0 | 0 | 0 | 1 | 0 |
| 1 | 1 | 0 | 0 | 0 | 1 | 1 | 0 | 0 | 0 | 1 | 0 | 0 | 0 | 1 | 0 | 0 |
| 0 | 1 | 0 | 0 | 1 | 1 | 0 | 0 | 0 | 0 | 1 | 0 | 0 | 1 | 0 | 0 | 0 |
| 0 | 1 | 0 | 0 | 0 | 0 | 1 | 0 | 0 | 0 | 1 | 0 | 1 | 0 | 0 | 0 | 0 |
| 0 | 1 | 0 | 0 | 0 | 1 | 0 | 0 | 0 | 0 | 1 | 0 | 0 | 0 | 0 | 0 | 1 |
| 0 | 1 | 0 | 0 | 1 | 0 | 0 | 0 | 0 | 0 | 1 | 0 | 0 | 0 | 0 | 1 | 0 |
| 1 | 0 | 0 | 0 | 1 | 0 | 1 | 0 | 0 | 0 | 0 | 0 | 0 | 0 | 1 | 0 | 0 |
| 0 | 0 | 0 | 0 |  |  |  | 0 | 0 | 0 | 0 | 0 |  |  |  |  |  |

FIG. 4

ENCODER/DECODER FOR CODE WORDS OF VARIABLE LENGTH

FIELD OF THE INVENTION

This invention relates to the field of error correction and detection of binary code words using cyclic codes.

DESCRIPTION OF THE PRIOR ART

Cyclic codes, in serial form, normally consist of $n$ bits constituting a code word in which the first $k$ bits are information bits and the last $n - k = r$ bits are check bits. For a given cyclic code generating polynomial, P($x$), there is a natural length $n$ for the code word. For Fire codes, i.e., where $P(x) = P_1(x)\ (x^c - 1,)$ polynomial $P_1(x)$ is an irreducible polynomial of degree $m$, and c is a positive integer, then the natural length is $n =$ L.C.M. ($e$,$c$), where e is the value of the exponent to which $P_1(x)$ belongs, i.e., the smallest positive integer such that $x^e - 1$ is divided by $P_1(x)$. Fire codes are defined and discussed more particularly in W. W. Peterson, Error Correcting Codes, M.I.T. Press, 1961, Chapter 10. For example, with $P(x) = (x^3 + x + 1)\ (x^5 + 1)$, $n =$ L.C.M. (7,5) = 35. The resulting code words have $k = 27$ information bits and $r = 8$ check bits. If a code word is generated having $n' < n$ bits, the result is a shortened code. The resulting shortened encoded words of length $n' = n - (k - k')$ has no effect on decoding, if no errors occur. This is because an encoded code word is equivalent to a natural length code word with $n - n'$ leading zeros. In the absence of errors, the decoder will generate a zero residue R($x$). However, if an error is detected, $n - n'$ leading zeros are inserted before correction. As has been pointed out by in the above-referenced book, Chapter 10, this $n - n'$ delay for a given $n'$ can be eliminated by a premultiplication of the residue R($x$) by $x^{n-k'}$ . This calls for additional feedback connections for the feedback shift register to realize the remainder of $x^{n-k'}$ /P($x$). However, this requires knowledge of how much the code words are shortened, which knowledge is fixed for that value.

Accordingly, the object of the invention is to provide an encoder/decoder which will accept a shortened cyclic code word of any shortened length, equal to or less than its natural length, without requiring zero fill.

SUMMARY OF THE INVENTION

A cyclic code encoder/decoder using a feedback shift register is augmented by an auxiliary feedback shift register and gating means for modifying the operation of the encoder/decoder shift register during correction. The auxiliary register is idle during encoding; it divides the received code word during decoding; and it modifies the feedback of the encoder/decoder shift register during error correction, if an error occurs during decoding, in accordance with the shortened code.

BRIEF DESCRIPTION OF THE DRAWINGS

FIGS. 2$a$–$c$ are diagrams illustrating operation of the FIG. 1 encoder/decoder.

FIG. 4 is a diagram illustrating operation of the FIG. 3 decoder.

DETAILED DESCRIPTION OF AN EMBODIMENT OF THE INVENTION

Figure 1:
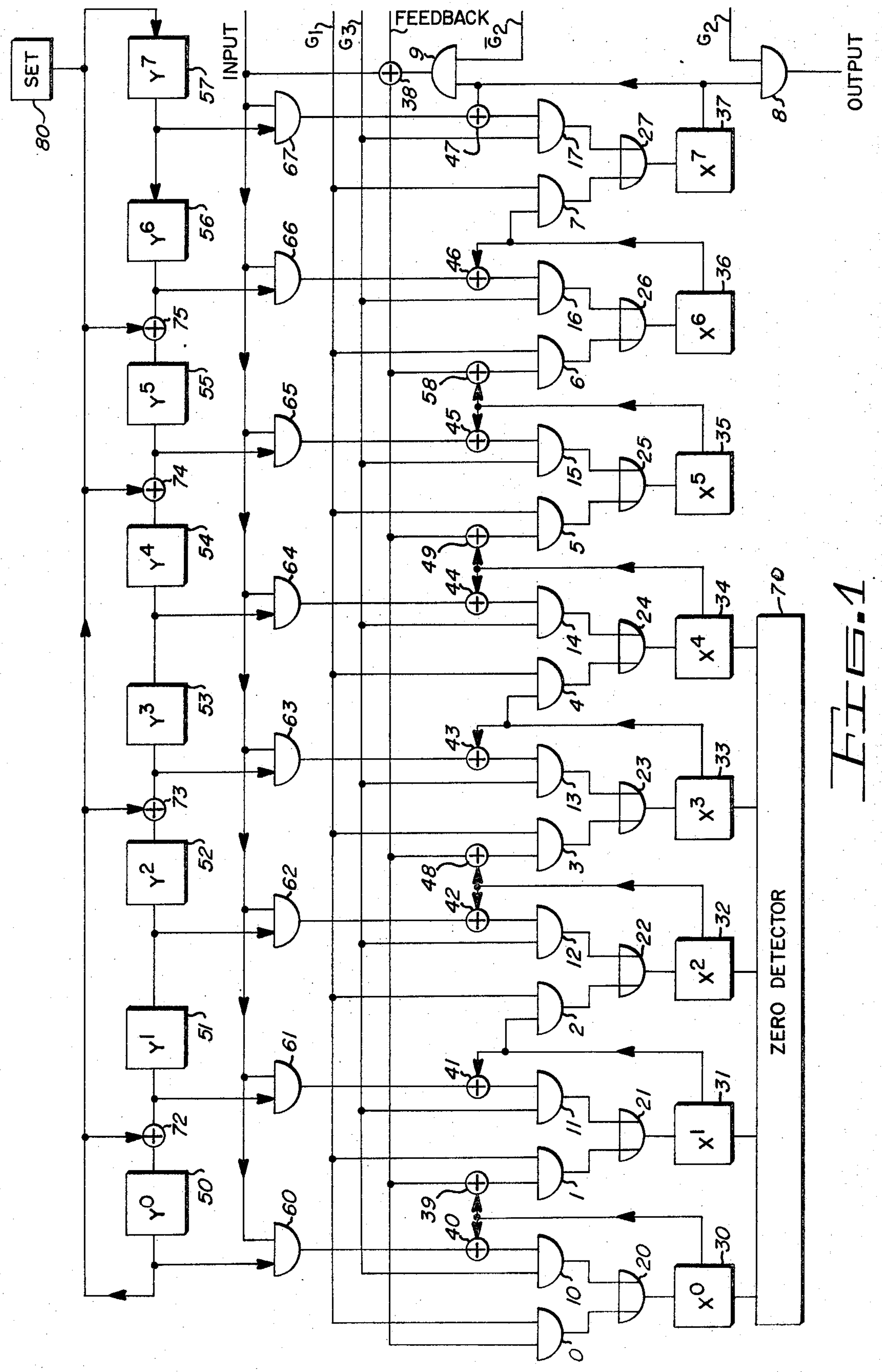
FIG. 1 is a block diagram of an encoder/decoder incorporating the invention.

FIG. 1 is a serial encoder/decoder for variable length code words using the generator polynomial $P(x) = x^8 + x^6 + x^5 + X^3 + x + 1$. An encoder/decoder feedback shift register is comprised of eight register stages 30–37, which are conveniently conventional trigger flip-flops. Conventional encoder feedback is provided by applying the input information to the modulo 2 gate (known also as an Exclusive OR gate) 38, together with the output of the last stage 37 of the shift register, to the first stage 30, through AND gate 0 and OR gate 20. The stages 30–37, are series connected through respective AND gates 1–7 and OR gates 21–27. However, the feedback is added modulo 2 to the inputs of stages 31, 33, 35 and 36 by respective modulo 2 adder gates 39, 48, 49 and 58. In addition to the basically conventional encoder/decoder described, additional connections to the shift register stages 30–37 are provided by respective AND gates 10–17 which are connected to the shift register stages through the respective OR gates 20–27. The AND gates 10–17 have a common input, gate signal $G_3$. These gates have a second input from respective modulo 2 gates 40–47. The input to gates 40–47 is taken from the respective register stages 30–37 and respective AND gates 60–67. During error identification, gates 60–67 receive the code word and are selectively gated by respective stages 50–57 of an auxiliary feedback shift register. The auxiliary feedback shift register has standard feedback connections from stage 50 to stage 57 and modulo 2 adder gates 72–75 which are between stages 51 and 50, stages 53 and 52, stages 55 and 54, and stages 56 and 55, respectively.

During encoding, the gating signals are $G_1 = 1$, $G_3 = 0$ and $G_2 = 0$ while the information bits are transmitted, but $G_2 = 1$ while the check bits are transmitted. FIG. 2$a$ illustrates the encoder operation for a code shortened from twenty-seven information bits to ten information bits 1001000010. After the ten bits are transmitted, the residue 01000011 is transmitted by shifting the contents of shift register stages 30–37 through AND gate 8. These eight bits constitute the check bits 11000010, which are shifted out with the feedback inhibited by $\overline{G}_2 = 0$ applied to AND gate 9, and with the AND gate 8 having $G_2 = 1$ applied thereto. The auxiliary shift register is cleared during encoding and has no effect on the transmission. The $G_3 = 0$ input to gates 10–17 disables these gates.

FIG. 2$b$ illustrates the decoder operation for the code word generated in FIG. 1. The shift register stages 50–57 are initially cleared, except for the stage 57 of the auxiliary register which is initialized to a logical 1 by the set source 80. During decoding, while the auxiliary shift register divides by $x^1$ modulo P($x$), the input is selectively gated by the contents of the auxiliary shift register stages 50–57, through AND gates 60–67, to the register stages 30–37. Each stage has a feedback loop through modulo 2 adder gates 40–47, which have the output of gates 60–67 as a second input. During decoding, gate signals $G_1$ and $G_2$ are zero, but $G_3 = 1$, which enables the shift register feedback loops through respective AND gates 10–17 and OR gates 20–27. When there is no error, the residue is all zeros after decoding, and the code word decoding operation is terminated.

If the residue is nonzero, error correction is required. For error correction, the encoder/decoder is effectively operated in the same mode as for encoding information bits, with gate signal $G_1 = 1$, gate signal $G_2 = 0$, and gate signal $G_3 = 0$. In effect, zeros are received as inputs until the zero detector 70 detects all zeros in register stages 30–34. During this portion of error correction, gate signal $\overline{G}_2 = 1$ enables feedback. Thereafter, feedback is disabled with $\overline{G}_2 = 0$ and the error pattern in register stages 35–37 is shifted out and added modulo 2 with the externally buffered code word in the usual manner. In the example of FIG. 2*c*, the third and fourth bits are in error so that after a single operation, the error is detected.

Figure 3:
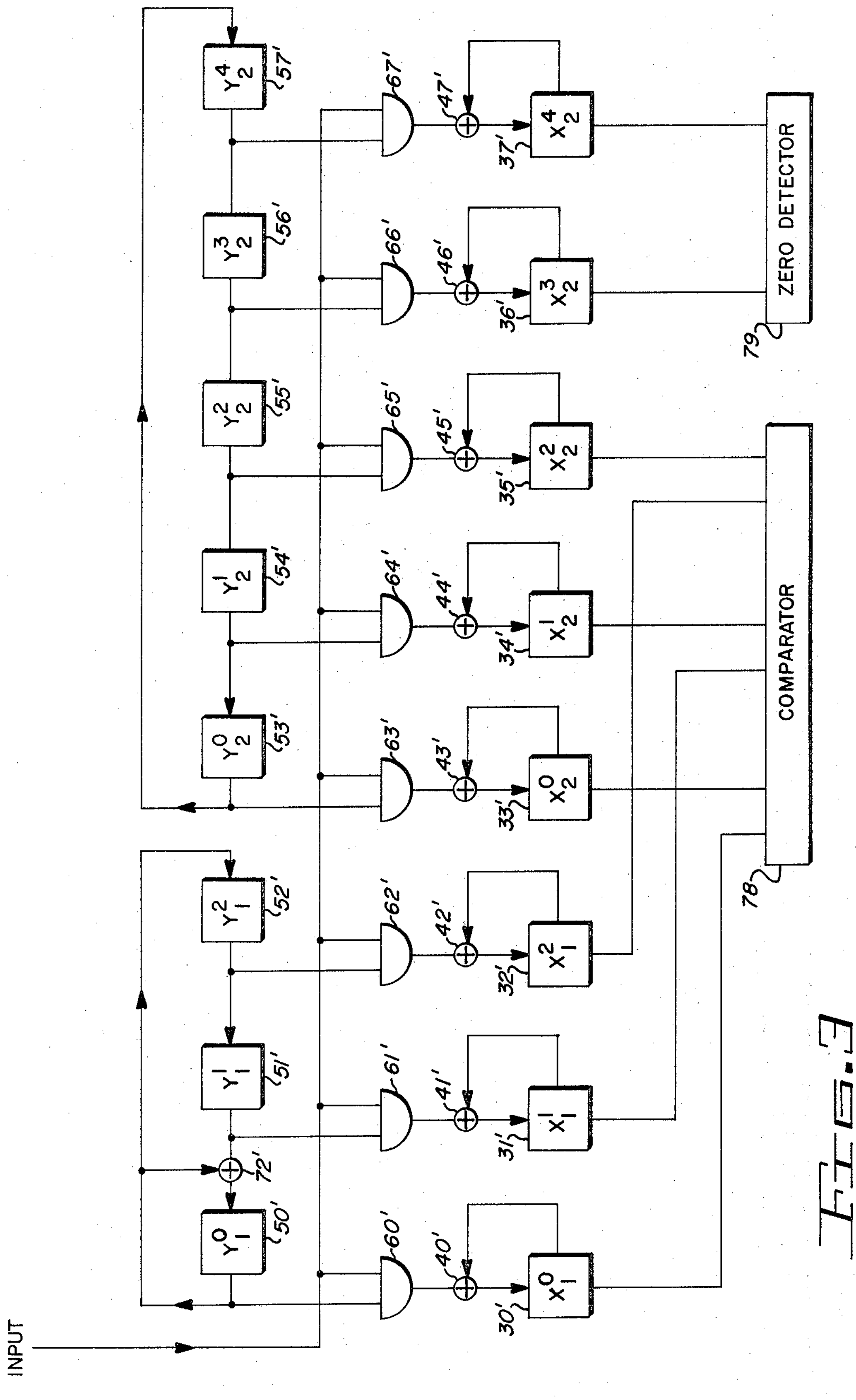
FIG. 3 is a block diagram of an alternative embodiment of the invention.

FIG. 3 is a variation on the FIG. 1 embodiment, in which the polynomial generator $P(x)$ is implemented in its factored form $(1+X+X^3)(1+X^5)$. This is desirable for Fire codes or other cyclic codes having the form $P(x) = P_1(x)(x^c + 1)$, where $c$ is greater than the degree of $P_1(x)$. The connections for the decoder only are shown, because the auxiliary shift register stages 50′ – 57′ only enter into the decoding and error identification modes of operation. The connections for the feedback register stages 30′ – 37′ are the same as in FIG. 1. In FIG. 3, the control register $y_1^i$ corresponds to the factor $(1+X+X^3)$, and the control register $y_2^i$ corresponds to the factor $(1 + X^5)$. The decoding operation is illustrated in FIG. 4 for the code word 100100001011000010. The factored form of the encoder/decoder has the advantage that it supports error identification as opposed to error correction. The process of error identification is described in IEEE Transactions on Information Theory, Vol. III - 15, No. 1, January 1969, pages 109–113.

It is understood that the above described encoder/decoder is only illustrative of the application of the principles of the invention. Numerous modifications and alternative arrangements can be devised by those skilled in the art.

What is claimed is:

1. An encoder/decoder for encoding binary words having a variable number $k'$ of information bits into cyclic code words of variable length $n'$, including a checking portion of a predetermined number $n$–$k$ of check bits, for transmission over a transmission channel, in which the cyclic code words are generated by a cyclic code generating polynomial $P(x)$ capable of generating, in accordance with a preselected cyclic code, cyclic code words of a maximum normal length $n$, of which a maximum $k$ bits are information bits and the remainder $n$–$k$ are check bits, where $k' \leq k$ and $n' \leq n$, for decoding encoded cyclic code words of length $n'$ received over said transmission channel into corresponding binary words of length $k'$, and for providing error correcting patterns for said decoded binary words, said encoder/decoder comprising:

A. a first set of $n$–$k$ shift register stages for use both in encoding and decoding operations and interconnected by circuit means so as to assume successive states, in accordance with the preselected cyclic code, and ultimately representing the checking portion in the case of an encoded word and representing an error correcting pattern in the case of a decoded binary word;

B. first gating means included within said circuit means and connected between the output of the last register stage and the inputs of predetermined other register stages of said first set of shift register stages, said first gating means being enabled to provide feedback to said predetermined register stages during the encoding of the $k'$ information bits of said binary word into the $n$–$k$ check bits of said code words and being disabled thereafter;

C. second gating means connected between the output of the last register stage and said transmission channel, said second gating means being enabled after $k'$ inputs to said first set of shift register stages, to pass the contents of said $n$–$k$ register stages, representing the checking portion of the encoded code word, to said transmission channel;

D. a second set of $n$–$k$ shift register stages for use in decoding operations only, said register stages being arranged to shift in response to each bit of a code word received over said transmission channel and being interconnected to provide feedback to predetermined ones of said second set of shift register stages, said second set of shift register stages being further arranged to shift in parallel with said first set of shift register stages during a decoding operation;

E. means for clearing said second set of shift register stages and setting a logical 1 into the highest order register stage upon the initiation of a decoding operation prior to the receipt of a code word to be decoded;

F. a set of $n$–$k$ gating means each being selectively gated by the contents of one of said second set of shift register stages and connecting a particular bit of the code word received over said transmission channel to selected ones of said first set of shift register stages, said second set of shift register stages thereby dividing the received code word by $x$ modulo $P(x)$;

G. a zero detector, responsive to the contents of a predetermined number of low order register stages of said first set of shift register stages, for indicating the presence or absence of a zero residue condition in said register stages after $n'$ bits of the code word have been received and decoded;

H. means responsive to an indication of the absence of a zero residue condition for enabling said first gating means and for supplying a succession of logical 0's to said first set of shift register stages from said transmission channel until said zero detector indicates a zero residue condition; and I. means responsive to an indication of the presence of a zero residue condition for disabling said first gating means and enabling said second gating means, to pass the contents of said $n$–$k$ register stages, representing an error pattern associated with the decoded binary word, to said transmission channel for utilization by exterior error-correcting means.

2. The endoder/decoder of claim 1, in which said second set of shift register stages is interconnected in accordance with the factored form $P_1(x)(x^c - 1)$ of the code generating polynomial $P(x)$.

3. A decoder for decoding cyclic code words of variable length $n'$ received over an input portion of a transmission channel into binary words having a variable number $k'$ of information bits, said cyclic code words being of the type generated by a cyclic code generating polynomial $P(x)$ capable of generating, in accordance with a preselected cyclic code, cyclic code words of a maximum normal length $n$, of which a maximum $k$ bits are information bits and the remainder $n$–$k$ are check bits, where $k' \leq k$ and $n' \leq n$, said cyclic code words of variable length $n'$ to be decoded each containing a checking portion of a predetermined number $n-k$ of check bits, and for providing error correcting patterns for said decoded binary words, said decoder comprising:

A. a first set of $n-k$ shift register stages interconnected by circuit means so as to assume successive states, in accordance with the preselected cyclic code, and ultimately representing the error correcting pattern for a decoded binary word;

B. first gating means included within said circuit means and connected between the output of the last register stage and the inputs of predetermined other register stages of said first set of shift register stages;

C. second gating means connected between the output of the last register stage of said first set of shift register stages and an output portion of said transmission channel;

D. a second set of $n-k$ shift register stages, said register stages being arranged to shift in response to each bit of a code word received over said input portion of said transmission channel and being interconnected to provide feedback to predetermined ones of said second set of shift register stages, said second set of shift register stages being further arranged to shift in parallel with said first set of shift register stages during a decoding operation;

E. means for clearing said second set of shift register stages and setting a logical 1 into the highest order register stage upon the initiation of a decoding operation prior to the receipt of a code word to be decoded;

F. a set of $n-k$ gating means each being selectively gated by the contents of one of said second set of shift register stages and connecting a particular bit of the code word received over the input portion of said transmission channel to said first set of shift register stages, said second set of shift register stages thereby dividing the received code word by $x$ modulo $P(x)$;

G. a zero detector, responsive to the contents of a predetermined number of low order register stages of said first set of shift register stages, for indicating the presence or absence of a zero residue condition in said register stages after $n'$ bits of the code word have been received and decoded;

H. means responsive to an indication of the absence of a zero residue condition for enabling said first gating means and for supplying a succession of logical 0's to said first set of shift register stages from the input portion of said transmission channel until said zero detector indicates a zero residue condition; and I. means responsive to an indication of the presence of a zero residue condition for disabling said first gating means and enabling said second gating means, to pass the contents of said $n-k$ register stages, representing an error pattern associated with the decoded binary word, to the output portion of said transmission channel for utilization by exterior error-correcting means.

4. The decoder of claim 3, in which said second set of shift register stages is interconnected in accordance with the factored form $P_1(x)\,(x^c - 1)$ of the code generating polynomial $P(x)$.

* * * * *